United States Patent
Delos Reyes et al.

(10) Patent No.: US 8,775,596 B2
(45) Date of Patent: Jul. 8, 2014

(54) ON-DEMAND CONTEXTUALLY AWARE STEERING RULES

(75) Inventors: Emerando Delos Reyes, Pleasan Hill, CA (US); Benjamin J. Parker, Vacaville, CA (US); Samir Ait-Ameur, Fremont, CA (US); Lin Sun, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 104 days.

(21) Appl. No.: 13/231,397

(22) Filed: Sep. 13, 2011

(65) Prior Publication Data

US 2013/0067112 A1    Mar. 14, 2013

(51) Int. Cl.
*G06F 15/173*    (2006.01)

(52) U.S. Cl.
USPC ........................................ 709/223

(58) Field of Classification Search
USPC .................. 709/239, 238, 240, 223; 370/236, 370/236.1, 236.2
See application file for complete search history.

(56) References Cited

U.S. PATENT DOCUMENTS

| | | | |
|---|---|---|---|
| 2005/0041584 A1* | 2/2005 | Lau et al. | 370/235 |
| 2008/0052396 A1* | 2/2008 | Tell et al. | 709/226 |
| 2010/0167728 A1* | 7/2010 | Venkitaraman et al. | 455/434 |
| 2011/0131307 A1* | 6/2011 | El Bazzal et al. | 709/223 |
| 2012/0220330 A1* | 8/2012 | Goldner et al. | 455/517 |
| 2013/0183971 A1* | 7/2013 | Tamaki et al. | 455/436 |

* cited by examiner

*Primary Examiner* — Chandrahas Patel
*Assistant Examiner* — Lan Huong Truong

(57) ABSTRACT

A server device may store policy information that includes subscription information associated with one or more user devices, and an indication of how to route traffic upon detecting traffic associated with the one or more user devices associated with the stored subscription information. The server device may receive information associated with a particular traffic flow, where at least some of the received information is derived from the particular traffic flow. The server device may compare the received information to the stored policy information. The server device may detect, based on the comparing, that the particular traffic flow is associated with a particular one of the one or more user devices associated with the stored subscription information. The server device may route the particular traffic flow based on the stored policy information.

15 Claims, 6 Drawing Sheets

| UD ID 405 | SOURCE ADDRESS 410 | SOURCE PORT 415 | DESTINATION ADDRESS 420 | DESTINATON PORT 425 | BASE STATION ID 430 | CELL ID 435 | UD STATUS 440 | FLOW TYPE 445 | TRAFFIC LOAD 450 |
|---|---|---|---|---|---|---|---|---|---|
| IMSI-1 | IP1 | PORT1 | IP4 | PORT4 | 120-1 | 1-C1 | ACTIVE | STREAMING VIDEO | BW-1 |
| MAC-2 | IP2 | PORT2 | IP5 | PORT5 | 120-1 | 1-C2 | INACTIVE | PROGRESSIVE DOWNLOAD | DR-2 |
| IMSI-3 | IP3 | PORT3 | IP6 | PORT6 | 120-K | K-C1 | ACTIVE | VOICE | BW-K |

FIG. 4

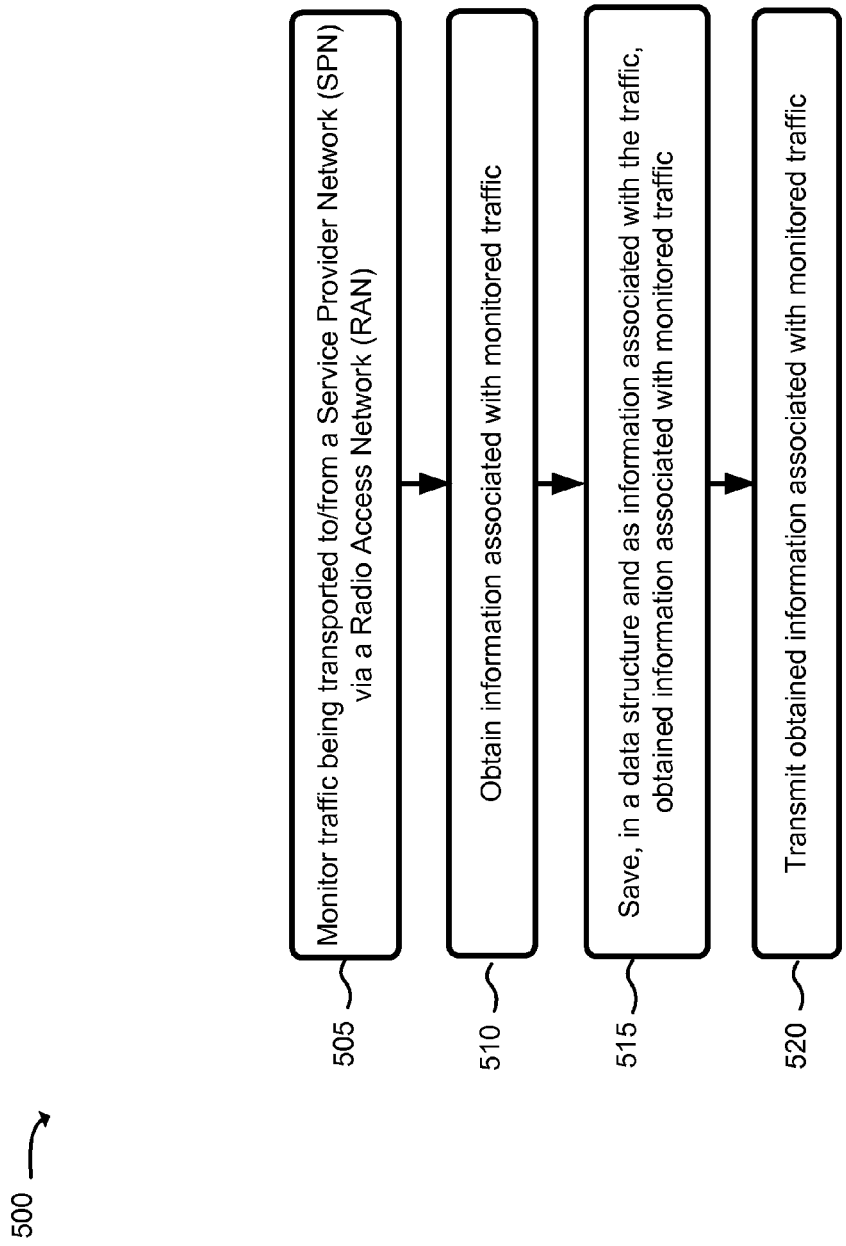

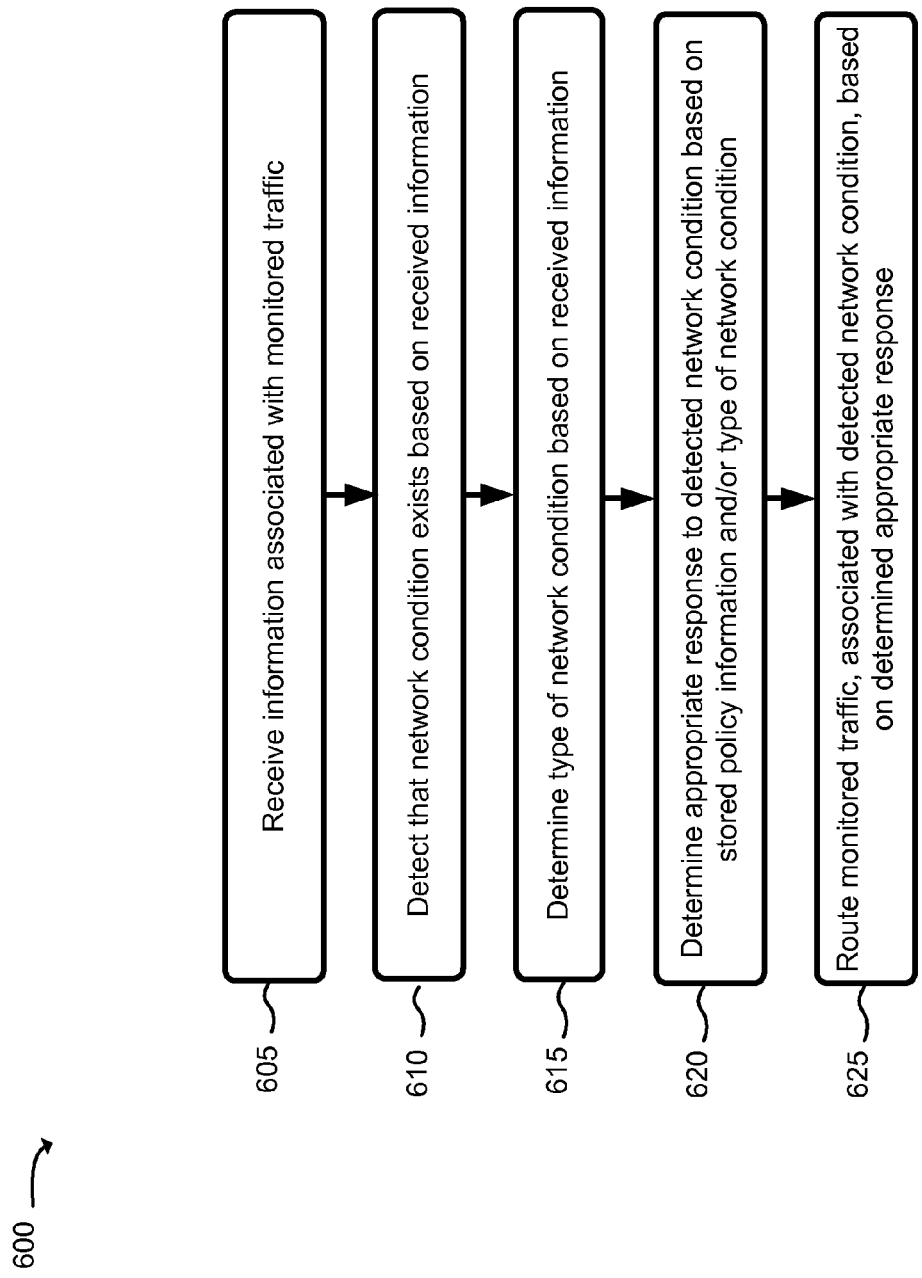

ON-DEMAND CONTEXTUALLY AWARE STEERING RULES

BACKGROUND

Service provider networks transport network traffic associated with a variety of services, applications, and content. The network traffic may include voice, text, video, and/or other data. Service provider networks are sized and/or scaled to transport an increasing quantity of traffic that is sent by and/or received from more and more user devices and/or content providers. Additionally, the increase in the quantity of traffic corresponds to an expanding demand for various types of services, applications, and/or content.

Unfortunately, service provider networks are not always able to dynamically handle traffic based on the nature of the traffic itself, or based on conditions detected in an access network. Additionally, service provider networks are not always able to concurrently provide multiple services to users. For example, while service provider networks may be able to provide a content filtering service to a user device, or provide a service that treats certain types of data streams to or from the user device in certain ways, service provider networks may not easily be able to provide both types of services to the same user device.

BRIEF DESCRIPTION OF THE DRAWINGS

FIG. 4 is a diagram of an example data structure that stores information associated with traffic being transported, to and/or from a user device, via a radio access network associated with a service provider network;

FIG. 5 is a diagram of an example process for obtaining information associated with a traffic flow; and FIG. 6 is a diagram of an example process for detecting a network condition and routing traffic upon detecting the network condition.

DETAILED DESCRIPTION OF PREFERRED EMBODIMENTS

The following detailed description refers to the accompanying drawings. The same reference numbers in different drawings may identify the same or similar elements.

A system and/or method, described herein, may enable information, associated with traffic being transported over a radio access network (RAN), to be dynamically obtained on a real-time basis. The information, associated with the traffic, may be used to detect whether a condition exists within the RAN. Based on the detection of the condition, the system and/or method may cause the traffic, transmitted via a service provider network with which the RAN is associated, to be transmitted to a user device in a manner that mitigates or remedies the condition.

As described herein, a RAN modeling server may monitor traffic flowing to and/or from the service provider network via the RAN. The RAN modeling server may monitor packets, associated with the traffic, that are being transported over the RAN via cells that serve one or more devices. The RAN modeling server may obtain information associated with the traffic based on the packet monitoring. The RAN modeling server may forward the information associated with the traffic to a content distribution system associated with the service provider network.

As also described herein, an analytics and reporting (AR) server, associated with the content distribution system, may use the information associated with the traffic, as well as subscriber information, associated with the user devices, to determine whether congestion and/or another condition (e.g., a need for content filtering, jitter, dropped packets, etc.) exists within the RAN. The AR server may send a notification that indicates that a condition exists within the RAN. The notification may include an instruction, to a content optimization (CO) server, associated with the content distribution system, to send traffic to the one or more user devices in a manner that mitigates and/or remedies the condition.

Figure 1:
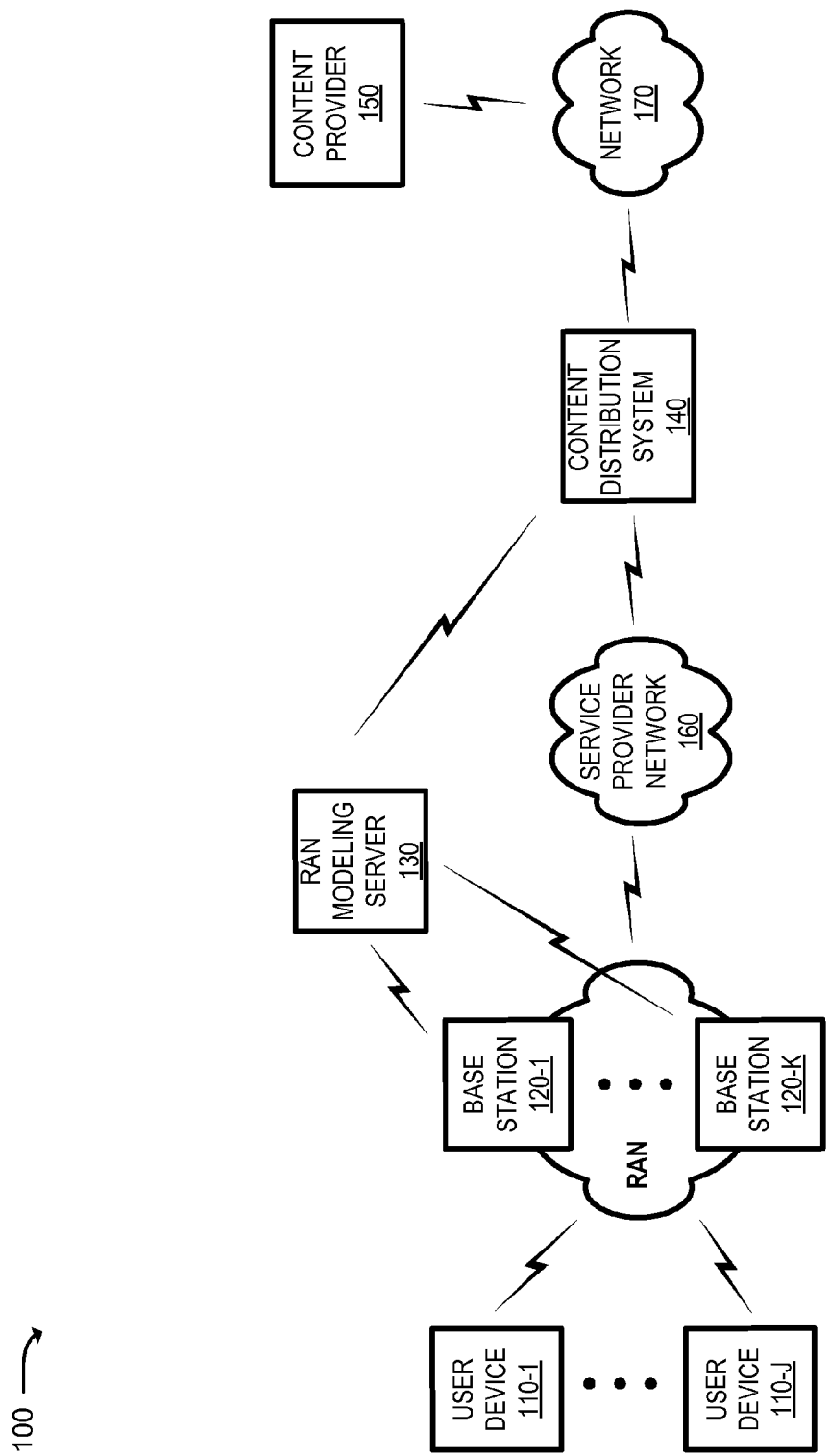
FIG. 1 is a diagram of an example environment in which systems and/or methods, described herein, may be implemented.

FIG. 1 is a diagram of an example environment 100 in which systems and/or methods described herein may be implemented. As shown in FIG. 1, environment 100 may include a group of user devices 110-1, . . . , 110-J (where J≥1) (hereinafter referred to collectively as "user devices 110" and individually as "user device 110"), a group of base stations 120-1, . . . 120-K (where K≥1) (hereinafter referred to collectively as "base stations 120" and individually as "base station 120"), a radio access network (RAN) modeling server 130 (hereinafter referred to as "RAN server 130"), a content distribution system (CDS) 140, a content provider 150, a service provider network 160 and a network 170. The number of devices, systems, and/or networks, illustrated in FIG. 1, is provided for explanatory purposes only. In practice, there may be additional devices, systems, and/or networks; fewer devices, systems, and/or networks; different devices, systems, and/or networks; or differently arranged devices, systems, and/or networks than illustrated in FIG. 1.

Also, in some implementations, one or more of the devices of environment 100 may perform one or more functions described as being performed by another one or more of the devices of environment 100. For example, RAN server 130 and CDS 140 may be integrated into a single device. Devices, systems, and/or networks of environment 100 may interconnect via wired connections, wireless connections, or a combination of wired and wireless connections.

User device 110 may include any computation or communication device, such as a wireless mobile communication device that is capable of communicating with base stations 120. For example, user device 110 may include a radiotelephone, a personal communications system (PCS) terminal (e.g., a device that may combine a cellular radiotelephone with data processing and data communications capabilities), a personal digital assistant (PDA) (e.g., a device that can include a radiotelephone, a pager, Internet/intranet access, etc.), a laptop computer, a camera, a personal gaming system, a smart phone, or another type of mobile computation or communication device.

Base station 120 may include one or more devices that receive, process, and/or transmit traffic, such as voice, video, text, and/or other data, destined for and/or received from user device 110. In one example, base station 120 may be a NodeB and/or radio network controller (RNC). In one example implementation, base station 120 may be an eNodeB within a long term evolution (LTE) network based on the Third Generation Partnership Project (3GPP) standard. As shown in FIG. 1, one or more base stations 120 may be associated with a RAN that receives traffic from and/or sends traffic to service provider network 160. Base station 120 may send traffic to and/or receive traffic from user device 110 via an air interface and may include one or more cells via which signals are received from and/or transmitted to user device 110.

RAN server 130 may include one or more server devices, or other types of computation or communication devices, that gather, process, search, store, and/or provide information in a manner similar to that described herein. RAN server 130 may, for example, monitor traffic being transported via cells associated with base station 120 to dynamically obtain information associated with the traffic being transported via base station 120. In one example, RAN server 130 may monitor one or more interfaces associated with signal bearers (such as, for example, an S1-U interface between base station 120 and a service gateway server (SGW) associated with service provider network 160) via which user device 110 communicates with service provider network 160. In another example, RAN server 130 may monitor one or more interfaces associated with control-plane signaling (such as, for example, an S11 interface between a mobility management entity (MME) server and the SGW and/or an S10 interface between the MME and another MME during, for example, a handover event). The control-plane signaling may control signal bearers during establishment or execution of a communication session associated with user device 110.

RAN server 130 may identify information associated with user device 110 from packets associated with the traffic. The information, associated with user device 110, may include a device identifier (e.g., a mobile directory number (MDN), an electronic serial number (ESN), a subscriber identity module (SIM) universal resource identifier (URI), an international mobile subscriber identifier (IMSI), and/or another identifier), a source address (e.g., an Internet protocol (IP) address), a status of user device 110 (e.g., active, dormant, off-line, etc.), etc. RAN server 130 may identify a type of traffic associated with user device 110 (e.g., streaming video, voice, data, etc.), information associated with a cell via which the traffic is being served to user device 110 (e.g., a cell identifier), information associated with a base station 120 with which the cell is associated (e.g., a base station identifier), etc. RAN server 130 may obtain information associated with a traffic load associated with the cell and/or base station 120 via which user device 110 is communicating. The information associated with the traffic load may identify a quantity of bandwidth, data rate, and/or throughput associated with the cell and/or base station 120. RAN server 130 may also detect handovers associated with user device 110, such as, for example, a handover into or out of the cell. RAN server 130 may transmit the information associated with the traffic to CDS 140.

CDS 140 may include one or more devices that gather, process, search, store, and/or provide information in a manner similar to that described herein. CDS 140 may perform operations associated with content distribution within environment 100. For example, CDS 140 may perform caching operations by obtaining content from content provider 150 and temporarily storing the content in a memory associated with CDS 140. CDS 140 may retrieve particular content, from the memory, in response to a request to receive the particular content from user device 110. CDS 140 may receive, from RAN server 130, information associated with traffic being transported via base station 120 to and/or from user devices 110.

CDS 140 may also store subscriber information associated with one or more user devices 110. Subscriber information for a particular user device 110 may include information relating to subscriptions associated with the particular user device 110. For example, the subscriber information for a particular user device 110 may indicate whether the particular user device 110 has subscribed to a content filtering service, in which certain content (e.g., adult content) may be restricted. Subscriber information for a particular user device 110 may also indicate bandwidth limits associated with the particular user device 110 (e.g., a subscriber associated with the particular user device 110 may have subscribed to a service where the subscriber is only entitled to use a certain amount of bandwidth over a given time period). CDS 140 may receive the subscriber information from a device that stores policy information (e.g., RAN server 130, a policy charging and rules function (not pictured), or any other device that maintains policy and/or subscriber information).

CDS 140 may use information associated with traffic to determine whether a condition exists within the RAN via which user devices 110 communicate with service provider network 160. CDS 140 may retrieve information associated with the traffic to identify trends associated with the traffic (such as, for example, whether a cell is congested (e.g., whether a quantity of bandwidth associated with the cell is above a predetermined threshold)). CDS 140 may also use attributes of traffic itself (e.g., identity of a subscriber associated with the traffic, a source address of the traffic, a destination address of the traffic, a source port of the traffic, a destination port of the traffic, a flow type of the traffic, etc.) to determine whether a condition exists within the RAN. CDS 140 may use the information/attributes associated with the traffic in connection with subscriber information, stored by CDS 140, to determine whether a condition exists within the RAN via which user devices 110 communicate with service provider network 160.

CDS 140 may take corrective action, in response to the detection of a condition, such as by transporting traffic to user device 110 to remedy, mitigate, or avoid the condition. CDS 140 may, for example, cause a data rate, at which video traffic is being streamed to user device 110, to be down-rated (e.g., decreased) in order to reduce congestion within a cell. Also, or alternatively, CDS 140 may process traffic in order to ensure that the content is sent to user device 110 in a manner that satisfies a quality of service (QoS) threshold. CDS 140 may also, or alternatively, convert traffic into a format and/or protocol based on a type of user device 110. CDS 140 may process the traffic by sending the traffic, to user device 110, at a bandwidth, data rate, and/or packet size that maximizes network throughput without introducing congestion, jitter, and/or other conditions. CDS 140 may additionally process the traffic by sending the traffic to a content filter when a user device 110, to which the traffic is being transmitted, is associated with a content filtering service.

Content provider 150 may include any type or form of content provider. For example, content provider 150 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 150 may produce media streams (e.g., television broadcasts). A "media stream," as used herein, may refer to a stream of content that includes video content (e.g., a video stream), audio content (e.g., an audio stream), and/or textual content (e.g., a textual stream). Content provider 150 may further include a provider that provides network-based text/picture web pages (e.g., Internet web sites).

Service provider network 160 may include one or more wired and/or wireless networks via which user devices 110 transmite and/or receive content. For example, service provider network 160 may include a cellular network, a Public Land Mobile Network (PLMN), a second generation (2G) network, a third generation (3G) network, a fourth generation (4G) network (e.g., a long term evolution (LTE) network), a fifth generation (5G) network, and/or another network. In another example, service provider network 160 may include a code division multiple access (CDMA) network and/or devices, a global system for mobile communications (GSM) network and/or devices, a general packet radio services (GPRS) network and/or devices, or a combination of a CDMA, GSM, GPRS networks. Additionally, or alternatively, service provider network 160 may include a wide area network (WAN), a metropolitan area network (MAN), an ad hoc network, an intranet, a fiber optic-based network (e.g., a fiber optic service (FiOS) network), and/or a combination of these or other types of networks.

Network 170 may include one or more wired and/or wireless networks. For example, network 170 may include a cellular network, the PLMN, a 2G network, a 3G network, a 4G network (e.g., an LTE network), a 5G network, and/or another network. Additionally, or alternatively, network 170 may include a WAN, a MAN, a telephone network (e.g., the Public Switched Telephone Network (PSTN)), an ad hoc network, an intranet, the Internet, a fiber optic-based network (e.g., a FiOS network), and/or a combination of these or other types of networks.

Figure 2:
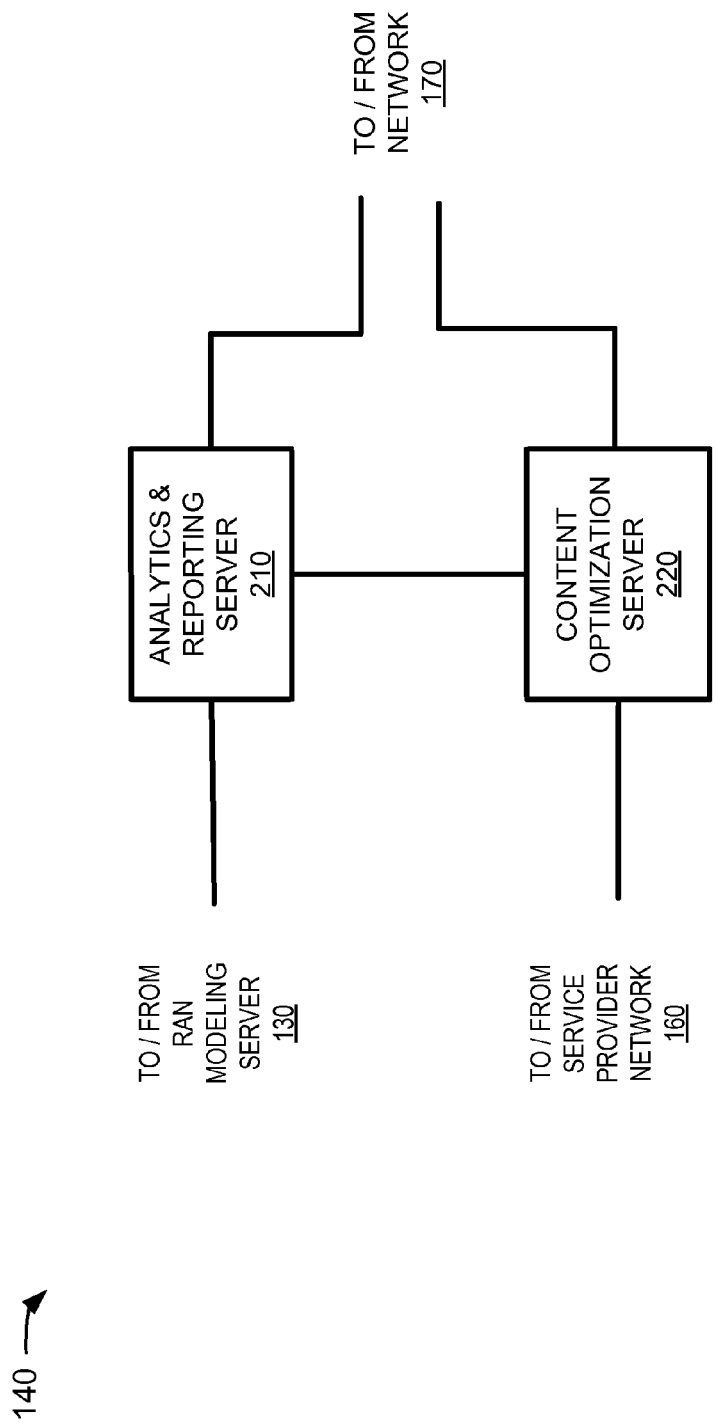
FIG. 2 is a diagram of example devices that may be associated with a content distribution system of FIG. 1.

FIG. 2 is a diagram of example devices of CDS 140. CDS 140 may include an analytics and reporting (AR) server 210 and a content optimization (CO) server 220. Although FIG. 2 shows example devices of CDS 140, in other implementations, CDS 140 may include fewer devices, additional devices, different devices, or differently arranged devices than depicted in FIG. 2. Additionally, or alternatively, one or more devices of CDS 140 may perform one or more tasks described as being performed by one or more other devices of CDS 140.

AR server 210 may include one or more server devices, or other types of computation or communication devices, that gather, process, search, store, and/or provide information in a manner similar to that described herein. In one example implementation, AR server 210 may determine whether a condition exists within a RAN associated with service provider network 160.

AR server 210 may receive, from RAN server 130, information associated with traffic being transported, via cells within the RAN, between service provider network 160 and user devices 110. AR server 210 may be programmed with an Application Programming Interface (API) that allows AR server 210 to receive and interpret the information from RAN server 130.

AR server 120 may retrieve, from a memory associated with AR server 210, policy information associated with the RAN. The policy information may, in one example, identify thresholds associated with a maximum quantity of bandwidth that the cells can transport before becoming congested. In another example, the policy information may identify a threshold associated with a respective maximum quantity of user devices 110 that can be served by each of the cells.

The policy information may also include subscriber information associated with one or more of user devices 110. Subscriber information, for a particular user device 110, may include information relating to subscriptions associated with the particular user device 110. For example, the subscriber information, for a particular user device 110, may indicate that the particular user device 110 has subscribed to a content filtering service, in which certain content (e.g., adult content) may be restricted. Subscriber information, for a particular user device 110, may also, or alternatively, indicate bandwidth limits associated with the particular user device 110 (e.g., a subscriber associated with the particular user device 110 may have subscribed to a service where the subscriber is only entitled to use a certain amount of bandwidth over a given time period).

AR server 210 may determine that a network condition exists, based on the received information associated with the traffic being transported, and/or subscriber information associated with the traffic. Based on a determination that a network condition exists, AR server 210 may send a notification to CO server 220 that indicates that the network condition exists.

AR server 210 may run multiple software processes (or "threads"), each thread corresponding to a particular traffic flow. A new thread may be instantiated when AR server 210 receives information for a particular traffic flow. When instantiating a new thread, AR server 210 may allocate resources (e.g., processor resources, disk resources, memory resources, etc.) to the thread. When AR server 210 detects that the particular traffic flow has terminated (e.g., upon receiving a notification from RAN server 130 that the traffic flow has terminated, or after an expiration of a particular duration of time since the last information regarding the traffic flow was received from RAN server 130), AR server 210 may terminate the thread. When the thread is terminated, resources (e.g., processor resources, disk resources, memory resources, etc.) that were allocated to the thread may be released (e.g., placed into a pool of available resources).

CO server 220 may include one or more server devices, or other types of computation or communication devices, that gather, process, search, store, and/or provide information in a manner similar to that described herein. In one example implementation, CO server 220 may perform content optimization operations on content being served to user devices 110. For example, CO server 220 may process content, destined for user device 110, to maximize throughput and/or avoid congestion while being transported over service provider network 160 and/or the RAN associated with service provider network 160. Also, or alternatively, CO server 220 may process the content to meet a level of QoS specified in a service level agreement (SLA) associated with a particular content provider 150 from which the content originates. CO server 220 may also, or alternatively, convert the content to a format, based on a type of user device 110, that enables the content to be received, processed, and/or rendered on user device 110 within a period of time that is less than a threshold. CO server 220 may also, or alternatively, route the content to one or more content filtering devices (not pictured), which may analyze the content based on content filtering parameters (e.g., parameters that indicate that adult content should be blocked), and block some or all of the content based on the parameters.

CO server 220 may receive a notification from AR server 210 that indicates that a condition, associated with one or more cells and/or base stations 120 within the RAN, exists. CO server 220 may, in response to the notification, cause content to be served to user device 110 in a manner that minimizes and/or avoids the condition on the RAN.

The notification may, in one example, indicate that streaming video (e.g., being served to user device 110 via a cell associated with base station 120) is being served at a data rate that is causing congestion within the cell. CO server 220 may, in response to the notification, down rate (e.g., decrease) the data rate and/or another data rate associated with streaming video being served to other user devices 110. Further, CO server 220 may down rate the data rate to a level that is less than a threshold. The threshold may be identified, by CO server 220 and/or AR server 210, as a level that reduces and/or remedies the congestion while maintaining a QoS, associated with the video stream and/or the other media streams (e.g., greater than a QoS threshold). The threshold may, in another example, be identified as a level in which a user, of the user device, does not perceive a reduction in video quality when the video is served at the down rated data rate.

Additionally, or alternatively, CO server 220 may, in response to the notification, serve content to user device 110 by resizing packets, associated with the content. Resizing the packets may enable the content to be more efficiently served to user devices 110. For example, CO server 220 may process the packets in a manner that conforms to a maximum transmission unit (MTU) associated with service provider network 160. Processing the packets in the manner that conforms to the MTU may permit the content to be served at a maximum data rate (e.g., greater than another threshold) while avoiding congestion within service provider network 160 and/or the RAN associated with service provider network 160.

CO server 220 may process the packets by performing packet and/or header compression. The packets may be resized and/or compressed to achieve a maximum bandwidth and/or data transfer rate while avoiding congestion and serving the content to user device 110.

The notification may indicate that traffic is destined for a user device 110, that is subscribed to a content filtering service. In response, CO server 220 may forward the traffic, destined for the user device 110, to one or more content filtering devices that analyze the traffic to determine whether the traffic includes content that is specified, by the subscriber information for user device 110, as restricted content.

CO server 220 may run multiple software processes (or "threads"), each thread corresponding to a particular traffic flow. A new thread may be instantiated when CO server 220 receives information for a particular traffic flow. When instantiating a new thread, CO server 220 may allocate resources (e.g., processor resources, disk resources, memory resources, etc.) to the thread. When CO server 220 is finished processing packets associated with the traffic flow, CO server 220 may terminate the thread. When the thread is terminated, resources (e.g., processor resources, disk resources, memory resources, etc.) that were allocated to the thread may be released (e.g., placed into a pool of available resources).

Figure 3:
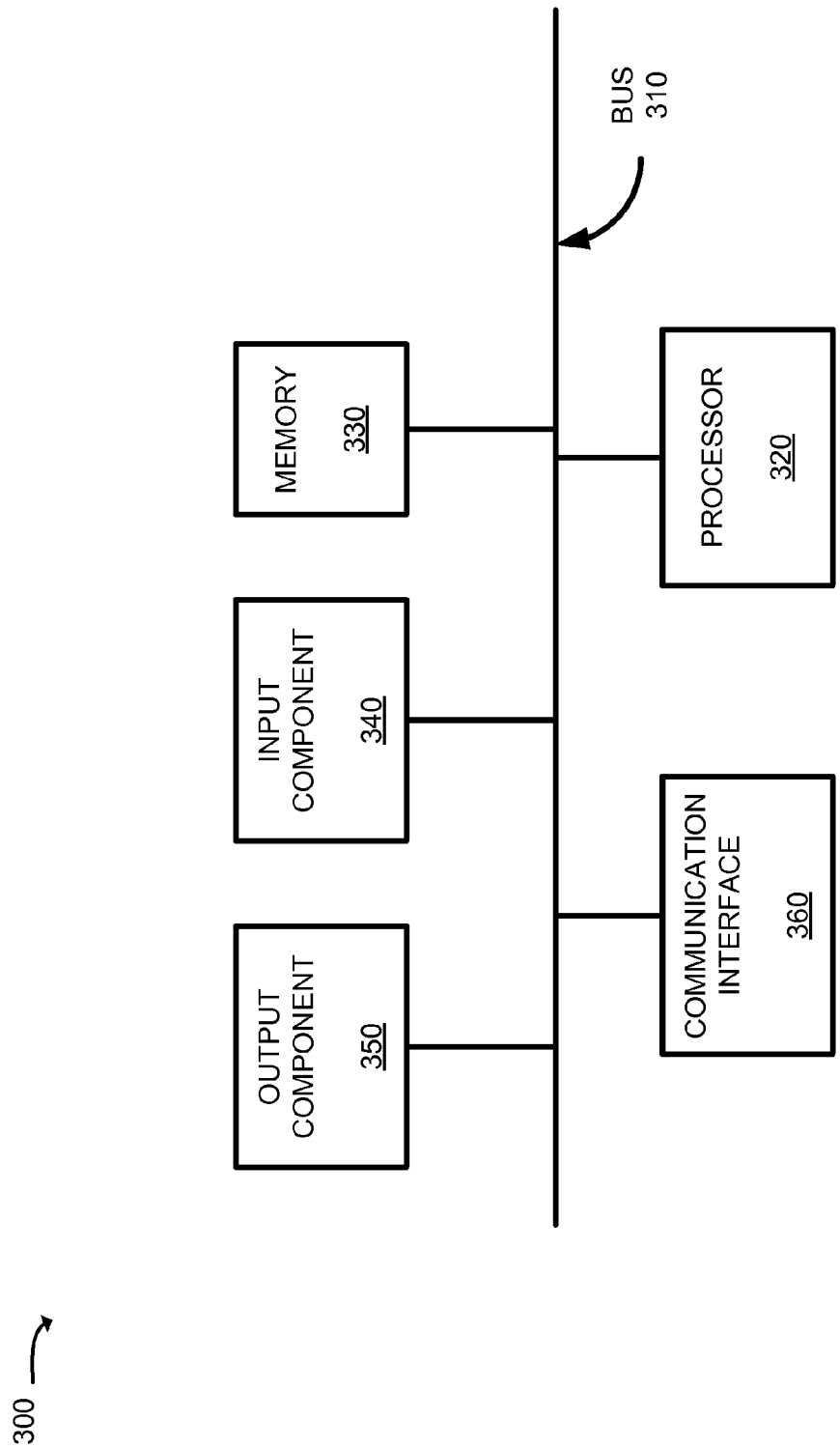
FIG. 3 is a diagram of example components of one or more of the devices of FIGS. 1 and 2.

FIG. 3 is a diagram of example components of a device 300 that may correspond to user device 110, base station 120, RAN server 130, content provider 150, AR server 210, and/or CO server 220. Alternatively, each of user device 110, base station 120, RAN server 130, content provider 150, AR server 210, and/or CO server 220 may include one or more devices 300. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path, or a collection of paths, that permits communication among the components of device 300. Processor 320 may include a processor, microprocessor, or processing logic that interprets and executes instructions. Memory 330 may include any type of dynamic storage device that stores information and instructions for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as service provider network 160 and/or network 170. In one alternative implementation, communication interface 360 may be a logical component that includes input and output ports, input and output systems, and/or other input and output components that facilitate the transmission of data to other devices.

As will be described in detail below, device 300 may perform certain operations relating to RAN modeling and condition detection within a RAN associated with service provider network 160. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example data structure 400 that stores information associated with traffic being transported, to and/or from user device 100, via a RAN associated with service provider network 160. RAN server 130 may monitor the traffic and may obtain information, associated with the traffic, for storage in data structure 400. Data structure 400 may include a collection of fields, such as a user device identifier (UD ID) field 405, a source address field 410, a source port field 415, a destination address field 420, a destination port field 425, a base station identifier (base station ID) field 430, a cell identifier (cell ID) field 435, a user device status (UD status) field 440, a flow type field 445, and a traffic load field 450. Data structure 400 includes fields 405-450 for explanatory purposes. In practice, data structure 400 may include additional fields, fewer fields, different fields, or differently arranged fields than are described with respect to data structure 400.

UD ID field 405 may store information associated with user device 110 that communicates with service provider network 160. For example, the information, associated with user device 110, may include a device identifier (e.g., a MDN, an ESN, a SIM URI, an IMSI, and/or another identifier). Source address field 410 may store a network address (such as, for example, an IP address, a media access control (MAC)

address, a telephone number, etc.) associated with content provider 150. Source port field 415 may store a port number associated with content provider 150. Destination address field 420 may store a network address (e.g., an IP address, a MAC address, a telephone number, etc.) associated with user device 110. Destination port field 425 may store a port number associated with user device 110.

Base station ID field 430 may store information associated with base station 120 (e.g., a base station identifier), via which user device 110 communicates with service provider 160. Cell ID field 435 may store information associated with a particular cell (e.g., a cell identifier), associated with base station 120, that serves user device 110 when communicating with service provider network 160. UD status field 440 may store an indication regarding whether user device 110 is actively communicating with service provider network 160. For example, UD status field 440 may store an indication that user device 110 is present (e.g., powered up) on the RAN and actively communicating. Also, or alternatively, UD status field 440 may store an indication that user device 110 is present on the RAN, but is not actively communicating. In yet another example, UD status field 440 may store an indication that user device is not present on the RAN, such as, for example, when user device 110 is not powered up and/or is not located within a cell associated with the RAN.

Flow type field 445 may identify the manner in which user device is communicating with service provider network 160. For example, flow type field 445 may store an indication that user device 110 is receiving streaming video via the particular cell and/or base station 120. In another example, flow type field may store an indication that user device 110 is associated with a call session and/or message session (e.g., using a short message service (SMS) protocol, a multimedia message service (MMS) protocol, an IM protocol, an email protocol, etc.) with another user device 110 via the particular cell and/or base station 120, etc. Traffic load field 450 may store information associated with a bandwidth and/or data rate associated with a flow to and/or from user device 110 at a point in time or over a period of time.

RAN server 130 may monitor traffic being transported via one or more cells associated with one or more base stations 120 within the RAN and may store information, associated with traffic being transported to and/or from user device 110, in data structure 400. For example, RAN server 130 may store information associated with base station 120 (e.g., 120-1) and/or an identifier associated with a cell (e.g., 1-C1) associated with base station 120 (e.g., shown as ellipse 455). RAN server 130 may monitor packets associated with flows being transported via the cell and may obtain, from the packets, information associated with user device 110 such as, for example, a device identifier (e.g., IMSI-1), a source address (e.g., IP1), a source port (e.g., PORT1), a destination address (e.g., IP4), and/or a destination port (e.g., PORT4) (e.g., as shown by ellipse 455). RAN server 130 may, based on the packets, determine that user device 110 is present on the cell (e.g., active) and may identify a type of flow (e.g., streaming video) that is associated with user device 110 (e.g., as shown by ellipse 455). RAN server 130 may identify a traffic load, such as, for example, a quantity of bandwidth, a data rate, etc. (e.g., BW-1) relating to the flow associated with user device 110 (e.g., as shown by ellipse 455). RAN server 130 may obtain information associated with other traffic that is being transported via other cells and/or base stations 120 within the RAN (e.g., as shown by ellipse 457).

FIG. 5 is a flow chart of an example process 500 for obtaining information associated with traffic being transported to and/or from user device 110 via a RAN associated with service provider network 160. In one example implementation, process 500 may be performed by RAN server 130. In another example implementation, some or all of process 500 may be performed by a device or collection of devices separate from, or in combination with, RAN server 130.

As shown in FIG. 5, process 500 may include monitoring traffic being transported to and/or from a service provider network via a RAN (block 505). For example, RAN server 130 may monitor packets being transported via a RAN associated with service provider network 160. In one example, RAN server 130 may monitor packets being transmitted via interfaces associated with signal bearers (such as, for example, an S1-U interface) via which user device 110 communicates with service provider network 160. In another example, RAN server 130 may monitor one or more interfaces associated with control-plane signaling (such as, for example, an S11 interface when establishing or executing a communication session and/or an S10 interface during a handover event). When monitoring the packets, RAN server 130 may inspect a portion of the packets (e.g., a header portion, a trailer portion, a label portion, etc.) that does not include a payload portion of the packets. In another example implementation, RAN server 130 may inspect any portion of the packets (e.g., headers, trailers, labels, payloads, etc.).

As also shown in FIG. 5, process 500 may include obtaining information associated with the monitored traffic (block 510). For example, RAN server 130 may obtain, as a result of the packet monitoring, information associated with user device 110, such as a device identifier (e.g., a MDN, an ESN, a SIM URI, an IMSI, and/or another identifier), a source address (e.g., an IP address, a MAC address, etc.), a source port, etc. RAN server 130 may also identify a type of flow relating to user device 110. For example, the type of flow may include, but is not limited to, streaming video, progressive download, a voice call, a video conference, a message (e.g., based on an SMS protocol, MMS protocol, IM protocol, email protocol, etc.), a data session, etc. RAN server 130 may identify a traffic load associated with the flow by identifying a quantity of bandwidth and/or a data rate associated with the flow.

The obtained information may include information associated with a cell, via which user device 110 communicates with service provider network 160. The information associated with the cell may indicate an amount of traffic being handled by the cell (e.g., a traffic load). Such information may be useful in determining whether the cell is congested or can handle additional traffic.

As yet further shown in FIG. 5, process 500 may include saving, in a data structure and as information associated with the traffic, the obtained information associated with the traffic (block 515), and transmitting some or all of the obtained information associated with the traffic (block 520). For example, RAN server 130 may store information associated with the traffic in a data structure that is stored in a memory associated with RAN server 130 (e.g., in a data structure that includes some or all of the data shown in data structure 400). RAN modeling server 130 may send some or all of the obtained information associated with the traffic to AR server 210.

FIG. 6 is a flow chart of an example process 600 for routing traffic, being transported to and/or from user device 110 via a RAN associated with service provider network 160, based on a detected network condition. In one example implementation, process 600 may be performed by CDS 140 (e.g., by AR server 210 and/or CO server 220). In another example implementation, some or all of process 600 may be performed by a device or collection of devices separate from, or in combination with, CDS 140.

As shown in FIG. 6, process 600 may include receiving information associated with traffic being transported to and/or from user device 110 via a RAN associated with service provider network 160 (block 605). As mentioned above, the received information may identify attributes associated with user device 110 (e.g., a UD ID, a source address, a source port, etc.), a cell via which user device 110 communicates with service provider network 160 (identification of the cell, traffic load of the cell, etc.), and/or attributes of the traffic itself (e.g., flow type, etc.). The information may be received by one or more devices of CDS 140 (e.g., by AR server 210). The information may be received in the format of data structure 400. Alternatively, the information may be received in a similar format (e.g., a different arrangement from data structure 400, more information than data structure 400, or less information than data structure 400).

As also shown in FIG. 6, process 600 may include detecting, based on the received information, that a network condition exists (block 610), and determining a type of the network condition (block 615). When detecting that the network condition exists, AR server 210 may compare the received information to policy information stored by AR server 210.

For example, AR server 210 may detect that a network condition exists when a traffic load of a particular cell exceeds a predetermined threshold (e.g., the cell is "congested"). The traffic load may be identified from the received information (e.g., traffic load 450, included in data structure 400). The AR server 210 may also determine that a network condition exists when a traffic load of a particular cell is substantially higher than a traffic load of another cell (i.e., the traffic load of one cell is higher than the traffic load of another cell, by at least a predetermined threshold). The predetermined thresholds may be included in policy information stored by AR server 210.

Additionally, or alternatively, AR server 210 may receive a notification that a cell is congested. AR server 210 may receive such a notification from a device that monitors traffic on cells (e.g., a policy charging and rules function, or any other type of device that monitors traffic on cells). Upon detecting such a network condition, AR server 210 may determine that the type of detected network condition is a "congestion" network condition.

As another example, AR server 210 may detect that a network condition exists when user device 110 is associated with a content filtering service. AR server 210 may identify user device 110 by analyzing the information received at block 605 (e.g., by identifying a UD ID 405, destination address 420, and/or destination port 425). AR server 210 may compare the information (e.g., UD ID 405, destination address 420, and/or destination port 425) to policy information stored by AR server 210 to identify that user device 110 is associated with the content filtering service. When AR server 210 determines that user device 110 is associated with the content filtering service, AR server 210 may determine that a network condition has occurred, and that the type of network condition is a "content filtering" network condition.

As a further example, AR server 210 may detect that a network condition exists based on a type of traffic. AR server 210 may identify, from the received information (e.g., flow type 445, included in data structure 400), a type of the traffic. AR server 210 may store policy information that identifies one or more cells that should handle certain types of traffic (e.g., voice traffic, streaming video traffic, etc.). AR server 210 may also identify a cell that is handling the traffic (e.g., by identifying cell ID 435, included in data structure 400). If the identified cell is not one of the cells, indicated by the policy information, AR server 210 may determine that a network condition exists, and that the type of network condition is a "flow type" network condition.

Additionally, or alternatively, AR server 210 may identify that a flow type condition occurs based on a traffic load associated with a cell that is handling the traffic (e.g., based on traffic load 450, included in data structure 400). The policy information stored by AR server 210 may indicate a maximum traffic load for cells that handle traffic of a particular type. If the traffic load of the cell handling the traffic is equal to or greater than the maximum traffic load, indicated by the policy information, then AR server 210 may determine that a network condition exists, and that the type of network condition is a "flow type" network condition.

Once a network condition is detected, and/or when the type of network condition is determined, an appropriate response may be determined in response to the detected network condition (block 620). AR server 210 may store policy information indicating how to handle traffic, based on types of network conditions that occur. For example, AR server 210 may store policy information that indicates that traffic should be re-routed to a less congested cell when a "congestion" network condition occurs. In such a scenario, AR server 210 may identify the less congested cell, based on information received from RAN server 130 (i.e., information regarding congestion of one or more cells in the RAN).

Additionally, AR server 210 may store policy information that indicates that traffic should be re-routed to one or more content filtering devices when a "content filtering" network condition occurs. The policy information stored by AR server 210 may identify one or more content filtering devices associated with a content filtering subscription subscribed to user device 110, which is associated with the traffic. For example, if user device 110 is subscribed to a content filtering service that filters adult content, the policy information stored by AR server 210 may identify one or more content filtering devices that analyze traffic for adult content, and block the content from being received by user device 110 if the traffic includes adult content.

Furthermore, AR server 210 may store policy information that indicates that traffic should be re-routed to a particular cell (and/or to a less congested cell) when a "flow type" network condition occurs. The policy information stored by AR server 210 may identify certain cells, within the RAN, that are designated to handle certain flow types. For example, the policy information may specify that video stream traffic is to be handled by one set of cells, while audio stream traffic is to be handled by a different set of cells.

Upon determining the appropriate response to the network condition (e.g., forwarding traffic to a less congested cell when a "congestion" network condition occurs, forwarding traffic to a content filtering device when a "content filtering" network condition occurs, forwarding traffic to a different cell when a "flow type" network condition occurs, etc.), AR server 210 may communicate such appropriate response to CO server 220 via a notification message. The notification message may include any information that enables CO server 220 to forward the traffic. For example, the notification message may indicate one or more devices (e.g., cells) to which the traffic should be forwarded.

As further shown in FIG. 6, process 600 may include routing monitored traffic associated with the detected network condition, based on the determined appropriate response (block 625). For example, if the notification message from CO server 220 indicates that a "congestion" network condition has occurred, CO server 220 may forward traffic, identified by AR server 210 as being handled by a congested cell, to a different cell. As mentioned above, the different cell, to which to forward the traffic, may be identified in the notification message from AR server 210.

If the network condition is a "content filtering" network condition (as indicated by the notification message from AR server 210), the notification message from AR server 210 may identify one or more content filtering devices. CO server 220 may forward the traffic to the one or more content filtering devices identified by the notification message.

If the network condition is a "flow type" network condition (as indicated by the notification message from AR server 210), the notification message from AR server 210 may identify one or more cells to which to forward the traffic. CO server 220 may forward the traffic to the one or more cells identified by the notification message. Additionally, or alternatively, CO server 220 may first determine whether the one or more cells, identified by the notification message, are capable of serving user device 110 before forwarding the traffic to the one or more cells identified by the notification message.

The device(s) and processes described above allow traffic in a network to be intelligently routed based on network conditions, and/or characteristics of the traffic itself. The detection of network conditions, and the manner of handling traffic based on detecting network conditions, can be easily programmed and changed (e.g., by adding, removing, or editing policy information stored by CDS 140 and/or RAN server 130).

The foregoing description of implementations provides illustration and description, but is not intended to be exhaustive or to limit the possible implementations to the precise form disclosed. Modifications and variations are possible in light of the above teachings or may be acquired from practice of the implementations. For example, while series of blocks have been described with regard to FIGS. 5-6, the order of the blocks may be modified in other implementations. Further, non-dependent blocks may be performed in parallel.

It will be apparent that embodiments, as described above, may be implemented in many different forms of software, firmware, and hardware in the implementations illustrated in the figures. For example, while the above-described example embodiments are described in terms of a RAN in communication with a service provider network 160, the above-described device(s) and processes may be implemented in any type of network. For instance, instead of a RAN with a RAN server 130, user device 110 may be in communication with any type of network (e.g., a wireless LAN), that includes one or more traffic analysis devices that monitor traffic on the network. The network may also include one or more policy devices that store policy information associated with user device 110. The one or more traffic analysis devices and the one or more policy devices may provide traffic analysis and/or policy information to CDS 140 (or any other device that is capable of performing the functions described above with respect to CDS 140).

The actual software code or specialized control hardware used to implement embodiments is not limiting of the embodiments. Thus, the operation and behavior of the embodiments have been described without reference to the specific software code, it being understood that software and control hardware may be designed based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a server device communicatively coupled to a Radio Access Network (RAN) server that is associated with a RAN, via which traffic is transported between a service provider network and a plurality of user devices, the method comprising:

storing, in a memory device associated with the server device, policy information that includes:
subscription information associated with one or more of the user devices, an indication of how to route traffic upon detecting traffic associated with the one or more user devices associated with the stored subscription information;
receiving, by the server device, information associated with a particular traffic flow, in the RAN, where at least some of the received information is derived from the particular traffic flow;
comparing, by the server device, the received information to the stored policy information;
detecting, based on the comparing and by the server device, that the particular traffic flow is associated with a particular one of the one or more user devices associated with the stored subscription information, the detecting including: detecting that a network condition has occurred in the RAN when a first cell, of the RAN, that is associated with the particular traffic flow, is congested; and routing, by the server device, the particular traffic flow based on the stored policy information, the routing including: routing the particular traffic flow to a second cell of the RAN, wherein the second cell is less congested than the first cell.

2. The method of claim 1, where the first cell is congested when a bandwidth, associated with the first cell, is greater than or equal to a threshold bandwidth.

3. The method of claim 1, where the indication, of how to route traffic upon detecting traffic associated with the one or more user devices associated with the stored subscription information, includes an indication that the particular traffic flow should be routed to specified one or more devices; and
where routing the particular traffic flow based on the stored policy information includes routing the particular traffic flow to the specified one or more devices.

4. The method of claim 3, where the subscription is a content filtering service, and
where the specified one or more devices include a content filtering device that analyzes the particular traffic flow in order to determine whether the particular traffic flow includes restricted content.

5. A method, performed by a server device communicatively coupled to a Radio Access Network (RAN) server that is associated with a RAN, via which traffic is transported between a service provider network and a plurality of user devices, the method comprising:

storing, in a memory device associated with the server device, policy information that includes a threshold bandwidth, associated with one or more cells of the RAN;

receiving, by the server device and from the RAN server, information associated with a particular traffic flow, at a particular cell in the RAN, where the information includes a bandwidth being consumed at the particular cell;

comparing, by the server device, the bandwidth being consumed at the particular cell to the threshold bandwidth;

detecting, based on the comparing and by the server device, that a network condition has occurred when the particular cell is congested, the detecting including:

detecting that bandwidth being consumed at the particular cell is equal to or greater than the threshold bandwidth; and routing, by the server device, the particular traffic flow to a different cell, of the RAN, upon detecting that the network condition has occurred when the particular cell is congested.

6. The method of claim 5, where storing the policy information further includes:

storing an indication that a network condition has occurred when a traffic flow, in the RAN, includes a particular specified type of traffic.

7. The method of claim 6, where storing the policy information further includes:

storing an indication that a first traffic flow should be routed to a different cell of the RAN when the first traffic flow includes the particular specified type of traffic.

8. The method of claim 7, where the different cell is identified, by the policy information, as a cell that is associated with the particular specified type of traffic.

9. The method of claim 6, where the specified type of traffic includes at least one of:
a video stream,
an audio stream,
text data, or
picture data.

10. A device associated with a first network via which traffic is transported between a second network and a plurality of user devices, the device comprising:

one or more memory devices to store policy information that includes:

an indication of how to detect one or more network conditions in the first network, where the indication of how to detect one or more network conditions includes: an indication that a network condition has occurred in the first network when a particular cell, of the first network, that is associated with a particular traffic flow, is congested, an indication of how to route traffic upon detecting the one or more network conditions, where the indication of how to route traffic upon detecting the one or more network conditions includes:

an indication that the particular traffic flow should be routed to a different cell, of the first network, that is less congested than the particular cell, and a plurality of computer-executable instructions; and one or more processors to execute the computer-executable instructions to: receive information associated with the particular traffic flow, where at least some of the information is derived from the particular traffic flow; compare the received information to the stored policy information; detect, based on the comparing, that a particular network condition has occurred, the detecting including: detecting that the particular cell, associated with the particular traffic flow, is congested; and route the particular traffic flow to the different cell based on the stored policy information.

11. The device of claim 10, where the indication of how to detect one or more network conditions includes:

an indication that a network condition has occurred when a user, associated with the particular traffic flow, is associated with a service that requires packet forwarding to specified one or more devices;

where the indication of how to route traffic upon detecting the one or more network conditions includes an indication that the particular traffic flow should be routed to the specified one or more devices; and where when routing the particular traffic flow based on the stored policy information, the device is to route the particular traffic flow to the specified one or more devices.

12. The device of claim 11, where the service that requires packet forwarding to the specified one or more devices is a content filtering service, and where the specified one or more devices include a content filtering device that analyzes the particular traffic flow in order to determine whether the particular traffic flow includes restricted content.

13. The device of claim 10, where the indication of how to detect one or more network conditions includes:

an indication that a network condition has occurred when the particular traffic flow includes a particular specified type of traffic.

14. The device of claim 13, where the where the indication, of how to route traffic upon detecting the one or more network conditions, includes an indication that the particular traffic flow should be routed to a different cell, that is associated with the particular specified type of traffic, of the first network.

15. The device of claim 13, where the one or more processors are further to:

analyze information included in a packet, associated with the particular data flow, to identify the type of the traffic.

* * * * *